(12) United States Patent
Honaga et al.

(10) Patent No.: US 6,973,990 B2
(45) Date of Patent: Dec. 13, 2005

(54) ELECTRONIC CONTROL POWER STEERING DEVICE

(75) Inventors: Susumu Honaga, Aichi-ken (JP);
Yoshiharu Inaguma, Nagoya (JP);
Tsune Kobayashi, Aichi-ken (JP);
Nobuyuki Kawabata, Toyota (JP);
Fumio Ukai, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/483,248

(22) PCT Filed: Jul. 8, 2002

(86) PCT No.: PCT/JP02/06907

§ 371 (c)(1),
(2), (4) Date: Jan. 9, 2004

(87) PCT Pub. No.: WO03/006301

PCT Pub. Date: Jan. 23, 2003

(65) Prior Publication Data

US 2004/0168849 A1 Sep. 2, 2004

(30) Foreign Application Priority Data

Jul. 10, 2001 (JP) .............................. 2001-209371
Jul. 13, 2001 (JP) .............................. 2001-213137
Oct. 22, 2001 (JP) .............................. 2001-323070

(51) Int. Cl.[7] .............................................. B62D 5/04
(52) U.S. Cl. ................. 180/444; 74/388 PS; 74/424.82
(58) Field of Search ................................. 180/443, 444, 180/445, 446; 74/388 PS, 424.71, 424.82

(56) References Cited

U.S. PATENT DOCUMENTS

| 4,703,821 | A | * | 11/1987 | Shimizu ...................... 180/446 |
| 4,730,686 | A |   | 3/1988 | Shimizu |
| 4,754,829 | A | * | 7/1988 | Shimizu ...................... 180/446 |
| 4,766,970 | A | * | 8/1988 | Shimizu ...................... 180/444 |
| 6,116,371 | A | * | 9/2000 | Suyama et al. ............. 180/444 |
| 6,164,407 | A | * | 12/2000 | Cheng ........................ 180/444 |
| 6,390,230 | B1 | * | 5/2002 | Shimizu et al. ............. 180/444 |
| 6,454,044 | B1 | * | 9/2002 | Menjak et al. .............. 180/444 |
| 6,564,898 | B2 | * | 5/2003 | Takehara et al. ............ 180/444 |
| 6,749,040 | B1 | * | 6/2004 | Menjak et al. .............. 180/443 |
| 2002/0023512 | A1 | * | 2/2002 | Tsukada et al. ........... 74/424.81 |
| 2002/0096389 | A1 | * | 7/2002 | Saruwatari et al. ......... 180/444 |

FOREIGN PATENT DOCUMENTS

| EP | 1016581 | 7/2000 |
| JP | 60-025853 | 2/1985 |

(Continued)

*Primary Examiner*—Avraham Lerner
(74) *Attorney, Agent, or Firm*—Oblon, Spivak, McClelland, Maier & Neustadt, P.C.

(57) ABSTRACT

An electric power steering apparatus (11) includes a reduction mechanism (G) for transmitting the rotation of a rotating shaft (28*a*) of a motor (28) to a ball screw nut (20) while reducing the speed of the rotation. The reduction mechanism includes a drive gear (29), which is coaxially connected to the rotating shaft of the motor, and a driven gear (16*a*), which is arranged on the outer surface of the ball screw nut. Due to the reduction mechanism, the motor may be inclined relative to a rack shaft (18).

19 Claims, 11 Drawing Sheets

FOREIGN PATENT DOCUMENTS

| | | |
|---|---|---|
| JP | 151774/1985 | 10/1985 |
| JP | 164471/1985 | 10/1985 |
| JP | 157060/1986 | 9/1986 |
| JP | 6-44674 | 6/1994 |
| JP | 08-099643 | 4/1996 |
| JP | 8-207796 | 8/1996 |
| JP | 9-66844 | 3/1997 |
| JP | 9-123927 | 5/1997 |
| JP | 2000-095123 | 4/2000 |
| JP | 2000-280920 | 10/2000 |
| JP | 2000-280923 | 10/2000 |
| JP | 2000-350397 | 12/2000 |
| JP | 2001-97232 | 4/2001 |
| JP | 2001-315655 | 11/2001 |

* cited by examiner

ELECTRONIC CONTROL POWER STEERING DEVICE

BACKGROUND OF THE INVENTION

1. Field of the Invention

The present invention relates to an electric power steering apparatus that applies an assist force generated by a motor to a vehicle steering system.

2. Discussion of the Background

A rack-and-pinion steering apparatus is one type of known steering apparatuses for vehicles. In this type of steering apparatus, a steering wheel is connected to a pinion shaft having pinion teeth, and the pinion shaft rotates as the steering wheel is rotated. The pinion teeth of the pinion shaft mesh with rack teeth of a rack shaft, and the rack shaft moves along its axis as the pinion shaft rotates. The two ends of the rack shaft are connected to two steered wheels (front wheels) by tie rods, respectively. The steering angle of the steered wheels changes as the rack shaft moves in its axial direction.

An electric power steering apparatus including the known rack-and-pinion steering apparatus has an auxiliary motor and a ball screw mechanism for assisting the axial movement of the rack shaft. The ball screw mechanism includes a ball screw nut having a helical ball groove in its inner circumference, a helical ball groove provided in the outer circumference of the rack shaft, and a plurality of balls interposed between the two ball grooves. The ball screw nut and the balls convert the rotation of the motor into axial movement of the rack shaft.

A first prior art of an electric power steering apparatus, which includes a reduction mechanism for transmitting the rotation of a motor to a ball screw nut while reducing the speed of the rotation, is described in Japanese Laid Open Patent Publications Nos. 60-25853 and 8-99643.

In the first prior art, the reduction mechanism includes two spur gears which mesh with each other. One of the spur gears is connected to the rotating shaft of the motor, and the other one of the spur gears is fixed to a ball screw nut of a ball screw mechanism. In order to transmit the power of the rotating shaft of the motor to the ball screw nut via the two spur gears, the motor is arranged parallel to the rack shaft.

A second prior art of a steering apparatus is described in Japanese Laid Open Utility Model Publication No. 6-44674. The steering apparatus includes a reduction mechanism including a worm and a worm wheel that mesh with each other. The worm is connected to a rotating shaft of a motor, and the worm wheel is fixed to a ball screw nut of a ball screw mechanism. In order to transmit the power of the rotating shaft of the motor to the ball screw nut via the worm and the worm wheel, the rotating shaft of the motor is arranged perpendicular to the rack shaft.

A third prior art of an electric power steering is described in Japanese Laid Open Patent Publication No. 2000-95123. The steering apparatus includes a rack shaft, a stator having a coil that covers the rack shaft, and a rotor arranged coaxially with the rack shaft. The rotation of the rotor is converted into the movement of the rack shaft by a ball screw.

In a typical vehicle, other devices such as an engine, a transmission, etc., are arranged around the rack shaft. However, in the first prior art, the rotating shaft of the motor can only be arranged parallel to the rack shaft. In the second prior art, the rotating shaft of the motor can only be arranged perpendicular to the rack shaft. Therefore, the power steering apparatuses of the first and second prior arts have problems in that the motor interferes with the installation of other devices of the vehicle and the freedom of design in determining positions for installing other devices is restricted.

In the third prior art, the rack shaft, the stator, and the rotor are retained in a rack housing. The rack housing, which is relatively large, results in problems in that the rack housing interferes with the installation of other devices of the vehicle (the engine, transmission, etc.) and the amount of freedom of design in determining positions for installing other devices is restricted.

In addition, in the first to third prior arts, fastening means, such as bolts and nuts, integrally connects a casing retaining the electric motor to a housing, which retains a power-assist unit for transmitting the power of the electric motor to a steering gear mechanism. Therefore, there is a problem in that the vibration and noise of the electric motor are transmitted to the steering apparatus through the housing retaining the power assist unit and ultimately transmitted to the driver and the passenger compartment. In order to solve this problem, Japanese Laid Open Patent Publication No. 2000-350397 describes an electric power steering apparatus in which an electric motor and a housing are connected to each other by a bushing. The bushing has a metal body covered slightly by a rubber elastic member. Thus, the electric motor and the housing are connected to each other only by the metal body, and the transmission of vibration and noise of the electric motor cannot be blocked sufficiently. In addition, the electric motor is supported by the elastic member in a floating manner with respect to the housing, and rattling of the electric motor may occur due to the floating support. When the electric motor rattles, there is a risk of the rotating shaft of the electric motor applying excessive force to the power transmission shaft of the power assist unit, and therefore the power assist unit cannot be operated smoothly.

SUMMARY OF THE INVENTION

It is an object of the present invention to provide an electric power steering apparatus that increases the degree of freedom for the installation angle of a motor with respect to a rack shaft and a ball screw mechanism to facilitate the arrangement of other devices of the vehicle around the rack shaft and decrease the influence of errors in assembly and dimensional accuracy of components in a reduction mechanism. It is another object of the present invention to provide an electric power steering apparatus that blocks the transmission of vibration and noise of an electric motor.

To achieve the above objects, one aspect of the present invention provides an electric power steering apparatus which transmits a driving force of a motor to a rack shaft via a reduction mechanism and a ball screw mechanism to assist movement of the rack shaft in the longitudinal axis of the rack shaft. The reduction mechanism includes a drive gear connected to a rotating shaft of the motor and a driven gear which meshes with the drive gear and which is connected to the ball screw mechanism. The rotating shaft of the motor intersects the longitudinal axis of the rack shaft at an arbitrary angle.

DETAILED DESCRIPTION OF THE PREFERRED EMBODIMENTS

An electric power steering apparatus 11 according to a first embodiment of the present invention will be described below.

Figures 1A, 1B, 1C:
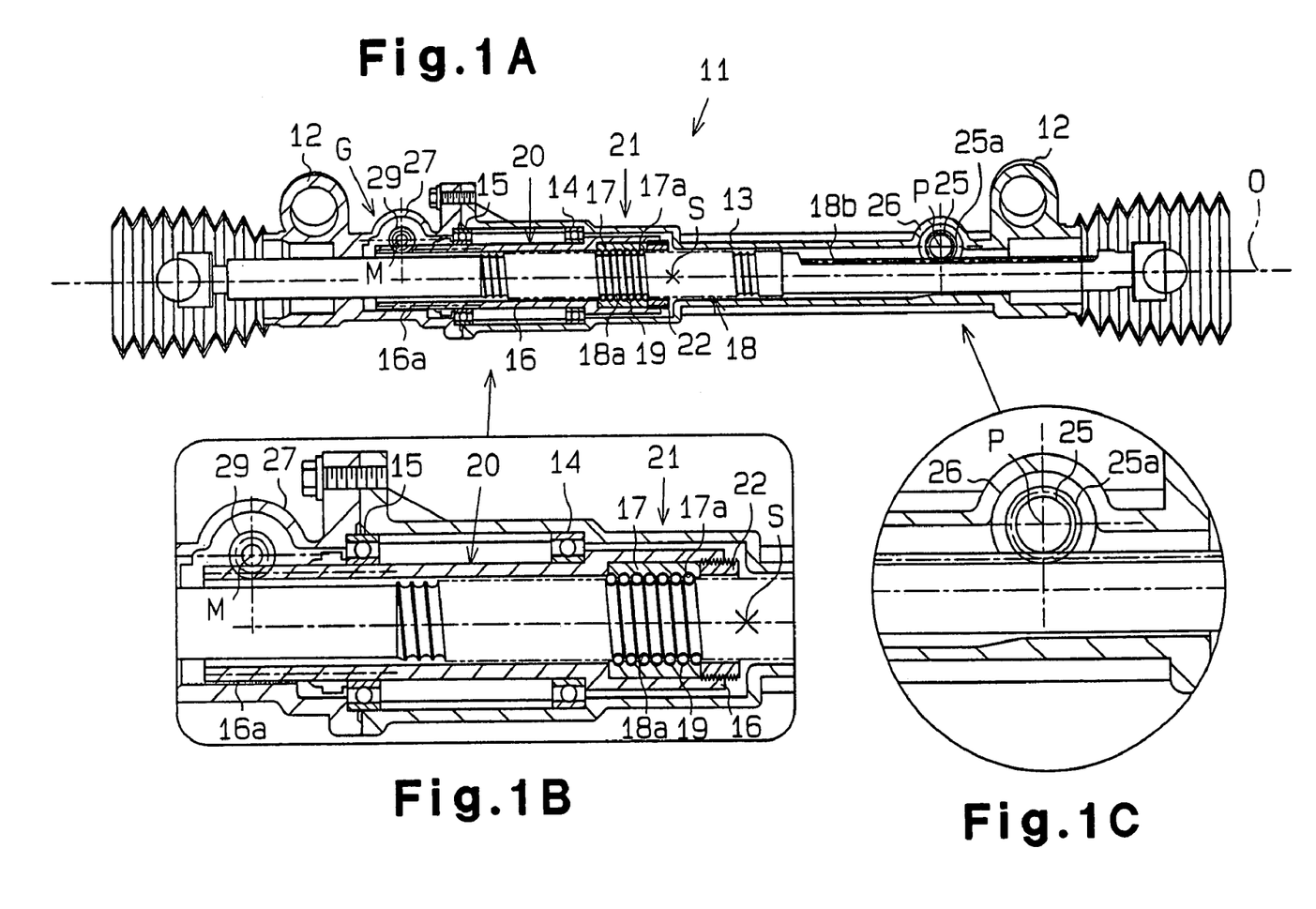
FIG. 1A is a cross-sectional view of an electric power steering apparatus according to a first embodiment of the present invention.
FIGS. 1B and 1C are enlarged partial views showing the power steering apparatus of FIG. 1.

As shown in FIG. 1A, the electric power steering apparatus 11 includes a hollow rack housing 13 which is provided with two attachments 12, each formed on one of the two ends of the steering apparatus 11. The power steering apparatus 11 is attached to a vehicle body (not shown) by fixing the attachments 12 to the vehicle body with screws.

As shown in FIG. 1B, the rack housing 13 supports a nut-retaining sleeve 16 with first and second bearings 14 and 15 so that rotation of the nut-retaining sleeve 16 is enabled but longitudinal movement of the nut-retaining sleeve 16 is disabled. The nut-retaining sleeve 16 has a large-diameter portion on the end near the center S of the rack housing 13 in the longitudinal direction of the rack housing 13. A nut 17 is fitted into the large-diameter portion.

A female thread is formed at the end of the large-diameter portion, and a lock screw 22 is engaged with the female thread. The nut 17 is pressed against a stepped portion of the large-diameter portion by the lock screw 22. The nut-retaining sleeve 16 and the nut 17 define a ball screw nut 20. The ball screw nut 20 covers part of a rack shaft 18.

A first ball groove 17a is formed helically in the inner circumferential surface of the nut 17. A second ball groove 18a is formed helically in the rack shaft 18 for a predetermined length in the longitudinal direction of the rack shaft 18. In the state shown in FIG. 1A, the first ball groove 17a faces the second ball groove 18a at the central region of the second ball groove 18a. A plurality of balls 19 are received between the first ball groove 17a and the second ball groove 18a in a manner that rolling of the balls 19 is enabled. The ball screw nut 20, the second ball groove 18a, and the balls 19 define a ball screw mechanism 21.

Due to the ball screw mechanism 21, the rotation of the rack shaft 18 with respect to the rack housing 13 is disabled but the axial movement of the rack shaft 18 is enabled. The two ends of the rack shaft 18 are respectively connected to left and right front wheels (not shown) by tie rods (not shown). In FIG. 1A, rack teeth 18b are formed in the rack shaft 18 at the right of the center S.

Figure 2:
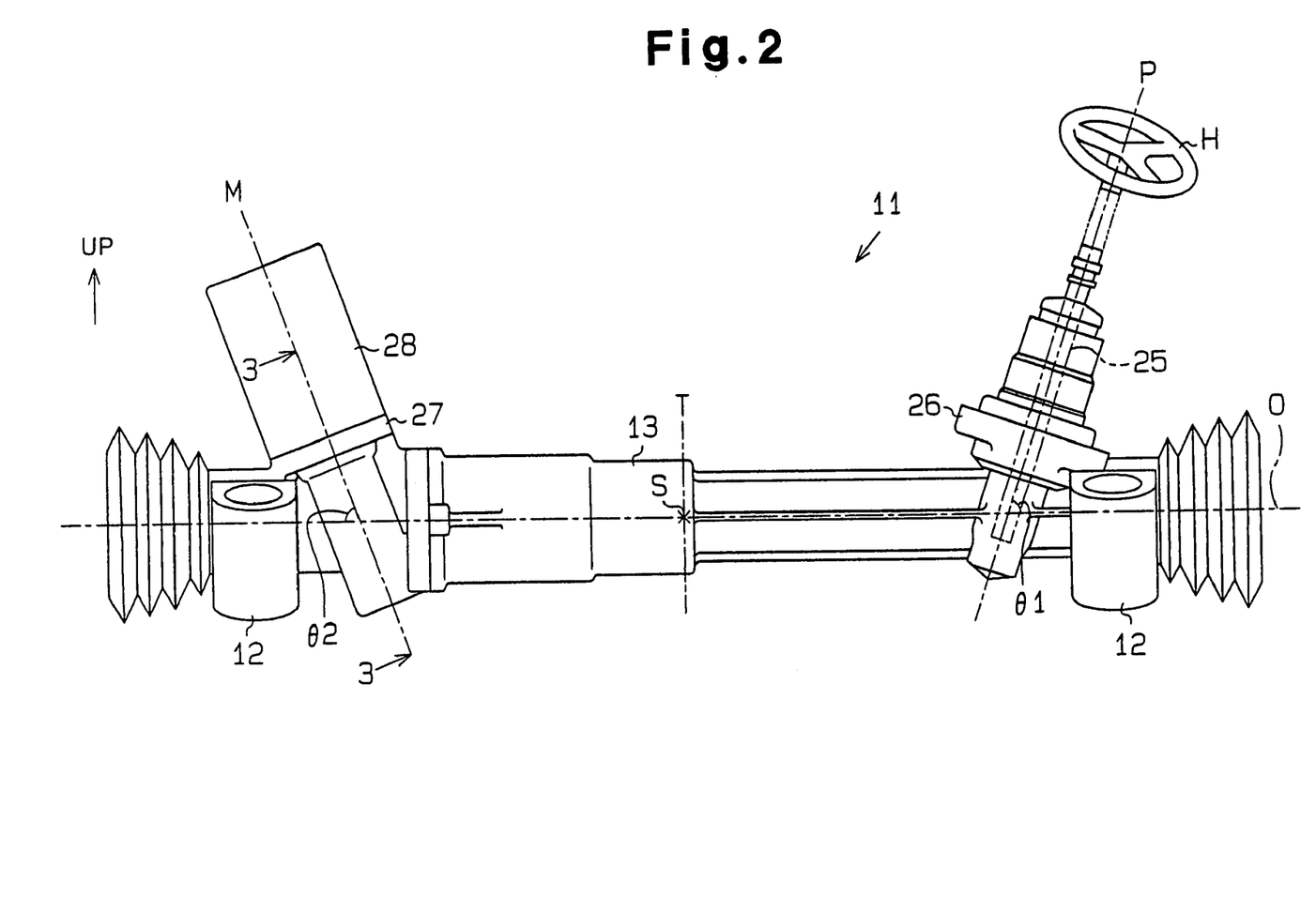
FIG. 2 is a front view showing the power steering apparatus of FIG. 1.

As shown in FIG. 2, a pinion shaft sleeve 26 is provided at the right of the center S of the rack housing 13, preferably in the vicinity of the right end of the rack housing 13. A pinion shaft 25 is rotatably disposed in the pinion shaft sleeve 26. Thus, the pinion shaft 25 is arranged near the end of the rack housing 13.

With reference to FIG. 2, the rotation of a steering wheel H rotates the pinion shaft 25. The axis P of the pinion shaft 25 is inclined at an angle θ1 with respect to the axis O of the rack housing 13 (the rack shaft 18). In the first embodiment, the angle θ1 is about 70 degrees.

As shown in FIG. 1A, a pinion gear 25a, which meshes with the rack teeth 18b, is formed on the basal end of the pinion shaft 25. The rack teeth 18b and the pinion gear 25a define a rack-and-pinion mechanism. Rotation of the steering wheel H rotates the pinion shaft 25 and the pinion gear 25a and moves the rack shaft 18 having the rack teeth 18b along the axis O. Movement of the rack shaft 18 changes the steering angle of the front wheels (not shown).

Figure 3:
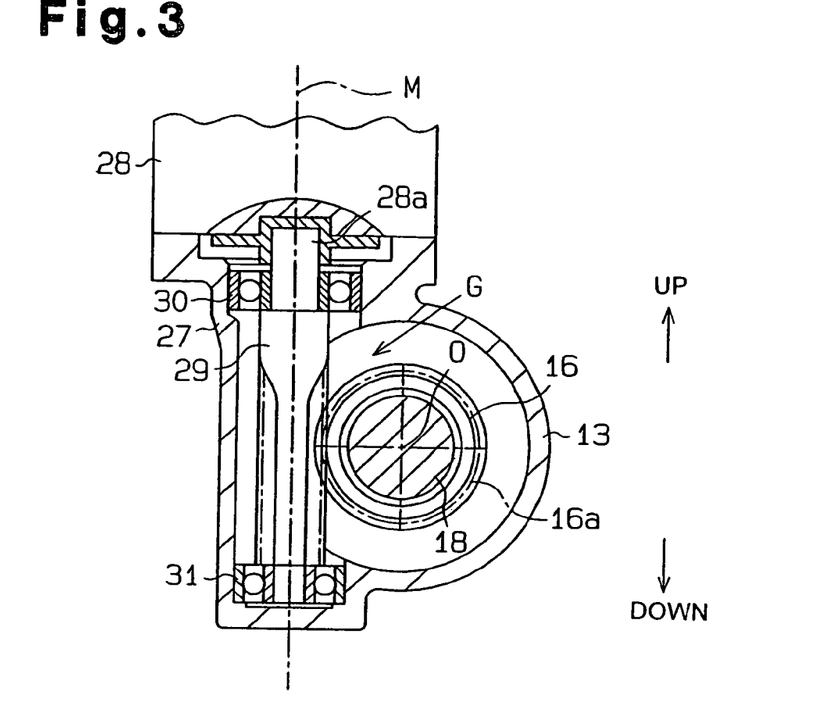
FIG. 3 is a cross-sectional view of a reduction mechanism in the power steering apparatus taken along line 3—3 in FIG. 2.

As shown in FIG. 2, a motor sleeve 27 used for attaching a motor 28 is provided at a position on the left of the center S of the rack housing 13, preferably in the vicinity of the left end of the rack housing 13. Accordingly, the motor 28 is arranged so as to face the pinion shaft sleeve 26 across the center S of the rack housing 13. As shown in FIG. 3, a rotating shaft 28a of the motor 28 is inserted in the motor sleeve 27. The axis M of the motor 28 (rotating shaft 28a) is inclined at an angle θ2 with respect to the axis O of the rack shaft 18. In the first embodiment, the angle θ2 is about 70 degrees.

A first screw gear 29, or a drive gear, is connected to the distal end of the rotating shaft 28a. The first screw gear 29 is rotatably supported by third and fourth bearings 30 and 31, which are fixed to the motor sleeve 27. As shown in FIG. 1B, a second screw gear 16a, or a driven gear, which meshes with the first screw gear 29, is formed on the outer circumferential surface of the nut-retaining sleeve 16 near the left end of the nut-retaining sleeve 16. The first screw gear 29 is coaxial with the rotating shaft 28a. The first screw gear 29 is in contact with the second screw gear 16a inclined at an angle of about 70 degrees. The first screw gear 29 and the second screw gear 16a define a reduction mechanism G (screw gear mechanism).

A reference line T, which extends through the center S of the rack housing 13 and which is perpendicular to the axis O is shown in FIG. 2. In the state in which the pinion shaft 25 and the motor 28 are connected to the rack housing 13, the axis P and the axis M are symmetric to each other about the reference line T. The pinion shaft 25 and the motor 28 are arranged on the same plane. Both the angle between the axis P and the reference line T and the angle between the axis M and the reference line T are about 20 degrees. Accordingly, the distance between the motor 28 and the pinion shaft 25 increases as the height from the rack housing 13 increases.

The rotating shaft 28a of the motor 28 rotates in both forward and reverse directions. The driving force of the motor 28 is transmitted to the nut-retaining sleeve 16 via the first screw gear 29 and the second screw gear 16a. The ball screw mechanism 21 converts the rotational torque of the nut-retaining sleeve 16 into an assist force for the reciprocating movement of the rack shaft 18 along the axis O. Due to this assist force, the steering force applied to the steering wheel H is reduced.

The power steering apparatus 11 according to the first embodiment has the advantages described below.

(1) In the reduction mechanism of the first prior art, the axes of the two spur gears can only be arranged parallel to each other. In the reduction mechanism of the second prior art, the axis of the worm and the axis of the worm wheel can only be arranged perpendicular to each other. In comparison, in the first embodiment, the reduction mechanism G is the screw gear mechanism including the first screw gear 29 and the second screw gear 16a. In the screw gear mechanism, the angle θ2 between the axis of the first screw gear 29 and the axis of the second screw gear 16a are set arbitrarily by adjusting the direction of the tooth trace and the helix angle. In other words, there is a greater freedom for setting the installation angle of the motor 28 with respect to the rack shaft 18 and the ball screw mechanism 21 compared to the prior arts. Therefore, the electric power steering apparatus 11 facilitates the arrangement of other devices of the vehicle (the engine, the transmission, etc.) around the rack shaft 18.

Figure 4:
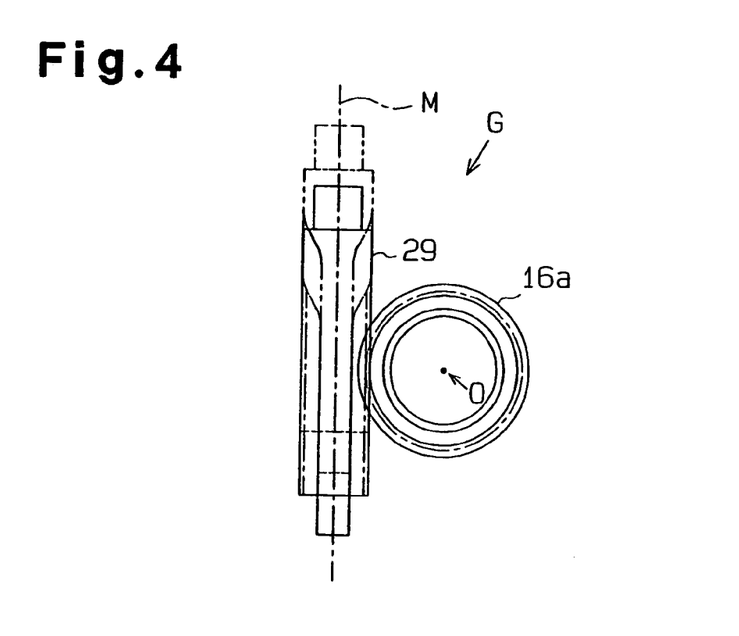
FIG. 4 is an enlarged partial view showing the reduction mechanism of FIG. 3.

(2) FIG. 4 is an enlarged view showing the meshing of the first screw gear 29 and the second screw gear 16a. Due to errors in assembly and dimensional accuracy of components in the electric power steering apparatus 11, the first screw gear 29 may be displaced. Since the reduction mechanism G is the screw gear mechanism, even when the first screw gear 29 is displaced to a position shown by the two-dot chain lines, the meshing of the first screw gear 29 with the second screw gear 16a is ensured. In the first embodiment, the influence of errors in components and installation errors is small.

(3) In the reduction mechanism G, the reduction ratio (the ratio of the number of teeth of the first screw gear 29 to the number of teeth of the second screw gear 16a) may easily be changed. By adjusting the reduction ratio, a compact and light motor with a low output torque may be used. This facilitates the installation of other devices. Since compact and light motors with a small output torque are relatively inexpensive, the electric power steering apparatus 11 is inexpensive.

(4) The ball screw mechanism 21 of the first embodiment includes the ball screw nut 20 having the first ball groove 17a, the second ball groove 18a provided in the outer circumference of the rack shaft 18, and the balls 19 arranged between the first ball groove 17a and the second ball groove 18a. The second screw gear 16a is provided on the outer circumference of the ball screw nut 20. Therefore, when the motor 28 and the first screw gear 29 rotate, the second screw gear 16a and the ball screw nut 20 rotate accordingly. The rotation of the ball screw nut 20 is converted into the axial movement of the rack shaft 18 with the assistance of the balls 19. Accordingly, since the second screw gear 16a is provided on the outer circumference of the ball screw nut 20, the driving force of the motor 28 is directly transmitted to the balls 19 via the second screw gear 16a and the ball screw nut 20 without loss.

(5) The second screw gear 16a is formed directly on the outer circumferential surface of the ball screw nut 20 (nut-retaining sleeve 16). Accordingly, in comparison to when the second screw gear 16a is formed separately from the ball screw nut 20, the number of components of the electric power steering apparatus 11 is reduced. In addition, it is not necessary to fix a separately formed second screw gear 16a to the ball screw nut 20.

(6) In the electric power steering apparatuses of the first and third prior arts, the motor is arranged at the center of the rack shaft. Accordingly, it is necessary to arrange the engine, the transmission, etc. such that they do not interfere with the motor. In comparison, in the first embodiment, the motor 28 is arranged near an end of the rack housing 13 and not in the vicinity of the center S of the rack housing 13. Accordingly, in the vehicle including the electric power steering apparatus 11, the arrangement of the engine, the transmission, etc. is facilitated.

(7) The motor 28 and the pinion shaft 25 are respectively arranged at the two ends of the rack housing 13. Accordingly, a relatively large space is provided around the central region of the electric power steering apparatus 11.

(8) The axis P of the pinion shaft 25 and the axis M of the motor 28 are symmetric to each other about the reference line T, which extends through the center S of the rack housing 13 perpendicular to the axis O. In other words, the distance from the reference line T to the axis P of the pinion shaft 25 is the same as that from the reference line T to the axis M of the motor 28. Accordingly, the electric power steering apparatus 11 has a superior balance of volume and weight.

(9) When the reduction mechanism includes a worm and a worm wheel, the reduction ratio must be greater than about 1/10. However, since the reduction mechanism G of the first embodiment includes the first screw gear 29 and the second screw gear 16a, the reduction ratio of the reduction mechanism G may be set to a value that is less than that of the worm gear mechanism and thus has a wide setting range.

(10) In the first embodiment, the distance between the motor 28 and the pinion shaft 25 increases as the height from the rack housing 13 increases. Accordingly, compared to when the distance between the motor and the pinion shaft decreases as the height from the housing increases or when the motor and the pinion shaft are perpendicular to the rack housing, the engine, the transmission, etc. are easily arranged above the rack housing 13 in the vehicle including the electric power steering apparatus 11 of the first embodiment.

The first embodiment may also be modified as follows.

The angle θ2 between the axis M of the motor 28 and the axis O of the rack shaft 18 is not limited to about 70 degrees. As the angle θ2 decreases, that is, as the upper end of the motor 28 is positioned further away from the center, the space available for installing the engine, the transmission, etc. increases.

The axis P and the axis M do not have to lie along the same plane. For example, the axis M may be rotated by a predetermined angle (for example, 90 degrees) with respect to the axis P. In such a case, it is preferred that the position of the motor sleeve 27 be changed. The motor 28 and the pinion shaft 25 may be arranged with a relatively large degree of freedom in accordance with the other devices that are installed in the vehicle.

The second screw gear 16a may be formed separately from the nut-retaining sleeve 16 and attached to the nut-retaining sleeve 16.

Figure 5:
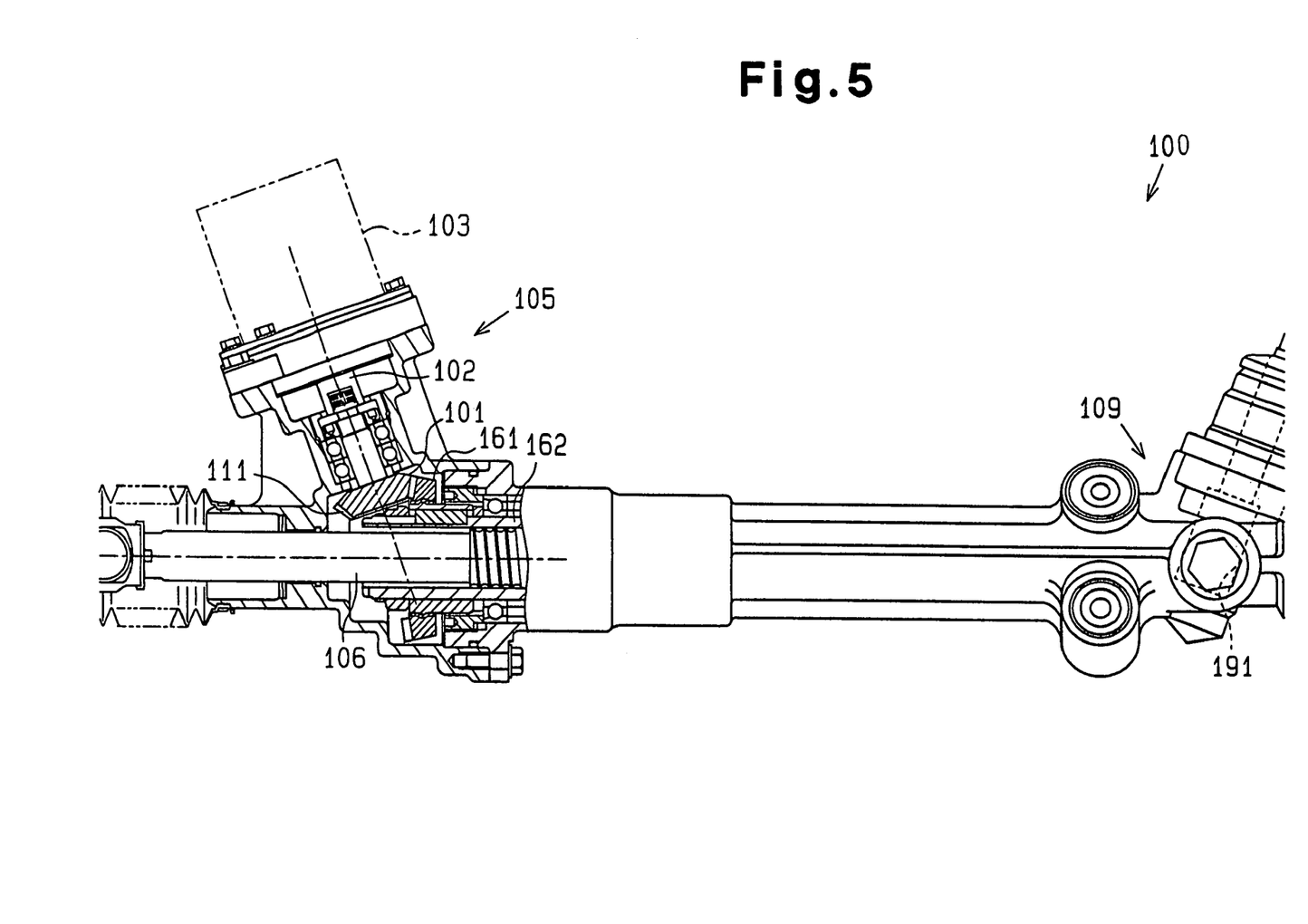
FIG. 5 is an outer view showing a power steering apparatus according to a second embodiment of the present invention.

An electric power steering apparatus 100 according to a second embodiment of the present invention will now be described. As shown in FIG. 5, the power steering apparatus 100 includes a steering gear mechanism 109, which is formed based on a rack-and-pinion gear mechanism, and a power-assist unit 105, which has an electric motor 103. The steering gear mechanism 109 includes a rack shaft 106 and a pinion gear 191, which is connected to a steering shaft (not shown). A ball screw mechanism 166 is formed between the rack shaft 106 and a ball nut 162.

Figure 6:
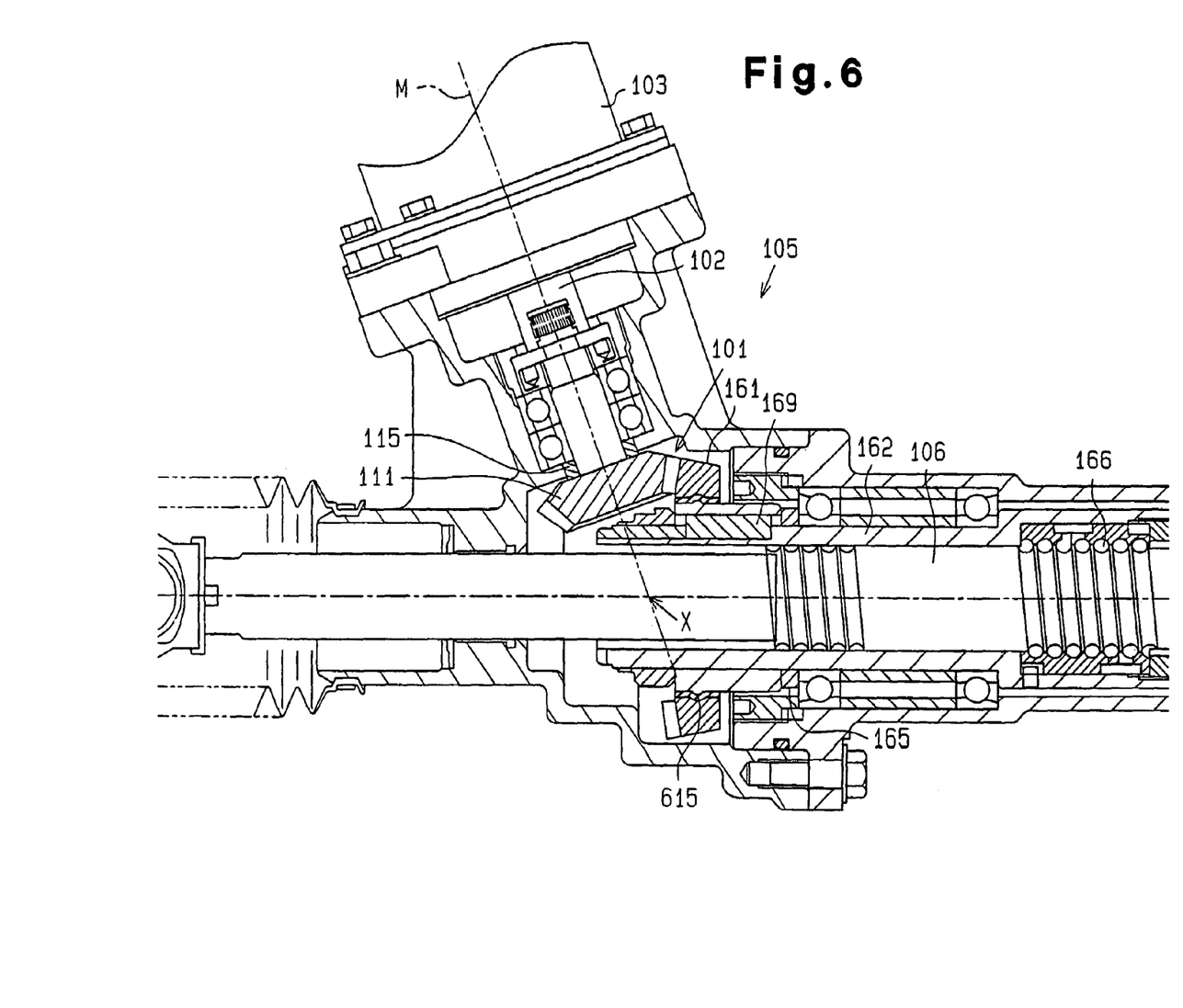
FIG. 6 is a cross-sectional view of the main part of the power steering apparatus shown in FIG. 5.

As shown in FIG. 6, the power-assist unit 105 includes a transmission mechanism (reduction mechanism) 101 for transmitting the power of the motor 103 to the rack shaft 106. The transmission mechanism 101 is a bevel gear mechanism including a driven bevel gear 161, which integrally retains the ball nut 162 with a retainer by means of a key 169, and a drive bevel gear 111, which meshes with the driven bevel gear 161. The motor 103 is connected to the rotating shaft of the drive bevel gear 111 by a coupling 102.

The transmission mechanism 101 of the second embodiment is an angular bevel gear mechanism in which the rotational axis of the motor 103 intersects the center axis of the rack shaft 106 at a predetermined angle, which excludes a right angle. However, the transmission mechanism 101 may also be a miter gear mechanism in which the intersection angle is 90 degrees. In addition, the driven bevel gear 161 may also be formed integrally with the ball nut 162.

In the power steering apparatus 100 of the second embodiment, the steering gear mechanism 109 and the power-assist unit 105 are arranged at different positions. More specifically, the pinion gear 191 and the power-assist unit 105 are separated from each other along the axis of the rack shaft 106 and lie along the same plane in a generally symmetric manner. Since the power-assist unit 105 is separated from the pinion gear 191, the power steering apparatus 100 is well-balanced. In addition, the structure around the pinion gear 191, where various components related to the steering gear mechanism 109 are arranged in a concentrated manner, is simplified. This enables the space around the steering gear mechanism 109 to be used effectively. In addition, when the installation position of the steering wheel is changed between left and right in accordance with where the vehicle is shipped to or for other reasons, the necessary changes in the power steering apparatus 100 can be made quickly.

Figure 7:
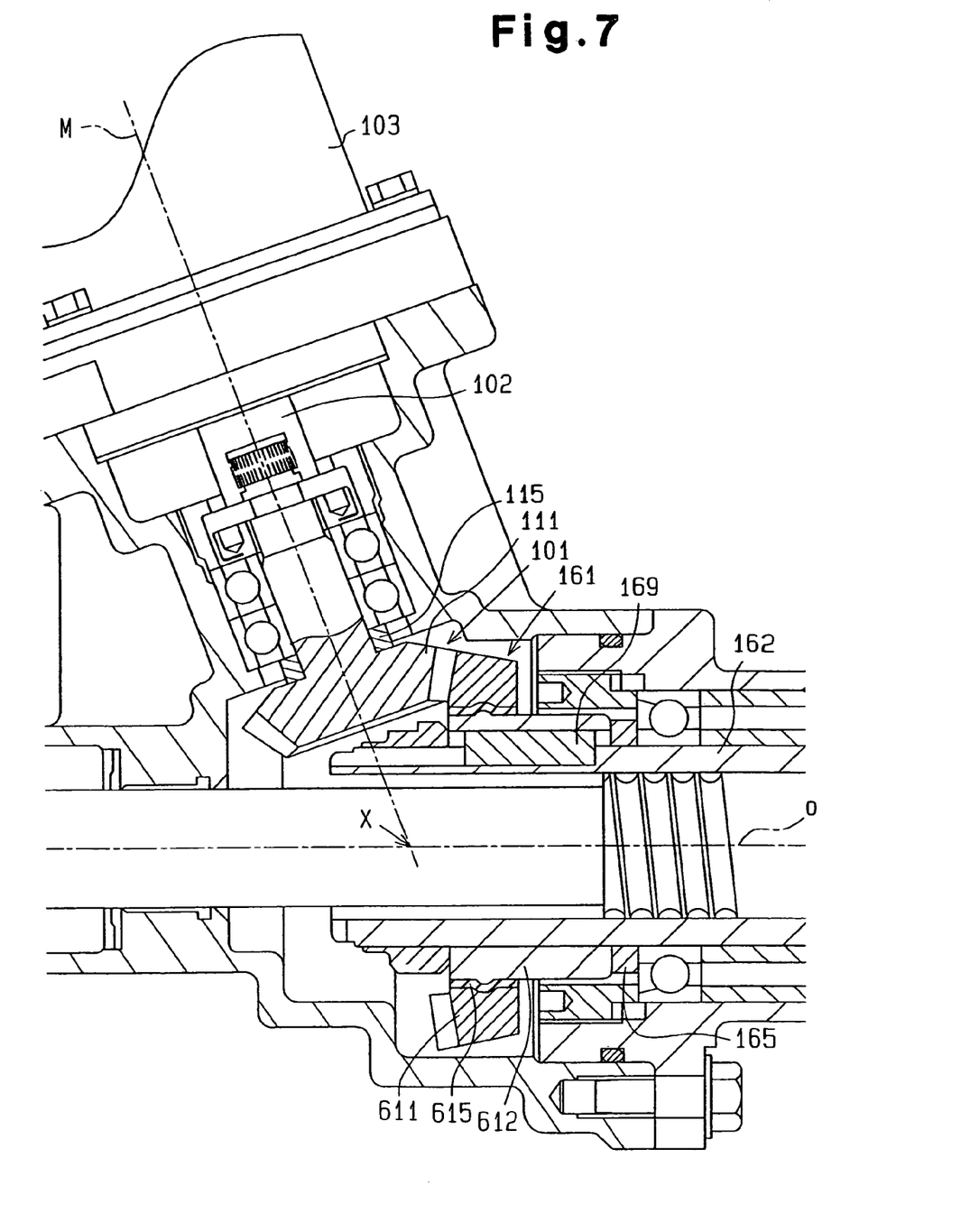
FIG. 7 is an enlarged view of FIG. 6.

Next, the power-assist unit 105 will be described. As shown in FIGS. 6 and 7, the rotating shaft of the motor 103 is connected to the relatively compact drive bevel gear 111 by the coupling 102, which may be an Oldham coupling. The drive bevel gear 111 meshes with the driven bevel gear 161. The driven bevel gear 161 is connected to the ball nut 162 by means of the key 169, and the ball nut 162 is connected to the rack shaft 106 by means of the ball screw mechanism 166. Accordingly, the driven bevel gear 161, the ball nut 162, and the rack shaft 106 are coaxial.

As shown in FIG. 7, the driven bevel gear 161 includes a ring portion 611 having teeth and a boss portion 612, contacts the key 169. A damper 615 composed of an elastic material such as rubber is arranged between the ring portion 611 and the boss portion 612. The cylindrical damper 615 is press-fitted between the ring portion 611 and the boss portion 612, or is formed by adhering an elastic body through vulcanization. The damper 615 serves to reduce the rattling noise generated by the bevel gears 111 and 161 and absorb impacts applied in the axial direction of the rack shaft 106 or around the bevel gear mechanism due to, for example, reverse input from the steered wheels.

As shown in FIG. 7, a collar 115 is attached to the shaft of the drive bevel gear 111, and a collar 165 is arranged adjacent to the driven bevel gear 161. The thicknesses of the collars 115 and 165 are adjusted such that the intersecting point X of the axis M of the drive bevel gear 111 (rotational centerline of the motor 103) and the axis O of the driven bevel gear 161 (rotational centerline of the rack shaft 106) is at a predetermined position on the axis of the rack shaft 106 and the backlash between the bevel gears 111 and 161 is set to an optimum value. When the prepared collars 115 and 165 have different thicknesses, the backlash between the collars 115 and 165 is always set at an optimum value regardless of differences between production lots.

The power steering apparatus 100 of the second embodiment has the advantages described below.

(11) Since the transmission mechanism 101 includes the angular bevel gear mechanism and backlash adjustment or the like is performed relatively easily using the collars 115 and 116, the power steering apparatus 100 is suitable for mass production.

(12) Since the bevel gear mechanism can perform reversible or two-way power transmission, even when the motor 103 fails to function or stops functioning, the steering operation may be performed manually with the pinion gear 191 and the steering shaft. Accordingly, the power steering apparatus 100 has a fail-safe function.

(13) The rotational axis M of the motor 103 intersects the axis O of the rack shaft 106 at point X, and the axis M of the motor 103 and the axis O of the rack shaft 106 lie on the same plane. That is, the motor 103 is installed such that the motor 103 is not offset from the rack shaft 106. As a result, the space around the power-assist unit 105 is used effectively.

(14) Since the power-assist unit 105 and the pinion gear 191 of the steering gear mechanism 109 are arranged symmetrically to each other, many parts of the power steering apparatus 100 can be used in common for right-hand drive vehicles and left-hand drive vehicles. In addition, even when the vehicle must be converted, for example, from left-hand drive to right-hand drive in accordance with where the vehicle is shipped to, the necessary changes can be made quickly.

(15) In the electric power steering apparatus 100 of the second embodiment, the transmission mechanism 101 is formed by a bevel gear mechanism. Since the power transmission efficiency of the bevel gear mechanisms is significantly superior to that of worm wheel mechanisms, the power of the motor 103 is efficiently transmitted to the rack shaft 106. As a result, a relatively compact motor may be used as the motor 103. In addition, although the distance between the axis of the worm and that of the wheel must be accurately maintained in worm wheel mechanisms, the restriction on the distance between the axes is relatively mild in bevel gear mechanisms.

(16) In the driven bevel gear 161 attached to the ball nut 162, the damper 615 composed of a rubber-like elastic material is provided on the boss portion 612. The damper 615 reduces abnormal noise generated by the power-assist unit 105, for example, the rattling noise generated by the bevel gear mechanism, which forms the transmission mechanism 101. In addition, when an impact force is applied in the axial direction of the rack shaft 106 or around the bevel gear mechanism due to, for example, reverse input from the steered wheels, the impact force is reduced by the damper 615.

(17) In the second embodiment, the driven bevel gear 161 is integrated with the ball nut 162, and the ball nut 162 is arranged coaxially with the rack shaft 106 by means of the ball screw mechanism 166. Accordingly, the power (assist force) of the motor 103 is transmitted to the rack shaft 106 via the ball screw mechanism 166, the frictional resistance of which is low, and the assist force of the motor 103 is smoothly transmitted to the steering gear mechanism 109.

(18) Since the transmission mechanism 101 is an angular bevel gear mechanism, the angle between the central axis of the drive bevel gear 111 and that of the driven bevel gear 161 can be set to any angle except a right angle. Accordingly, the intersection angle between the axis M of the motor 103 connected to the transmission mechanism 101 and the axis O of the rack shaft 106 may be set with a large degree of freedom and other devices can be easily arranged around the electric power steering apparatus 100.

When the transmission mechanism 101 includes a miter gear mechanism, the intersection angle between the central axes of the two gears is limited to a right angle. However, the advantages described above in items (11) to (17) are obtained.

Next, an electric power steering apparatus 200 according to a third embodiment of the present invention will be described.

Figure 8:
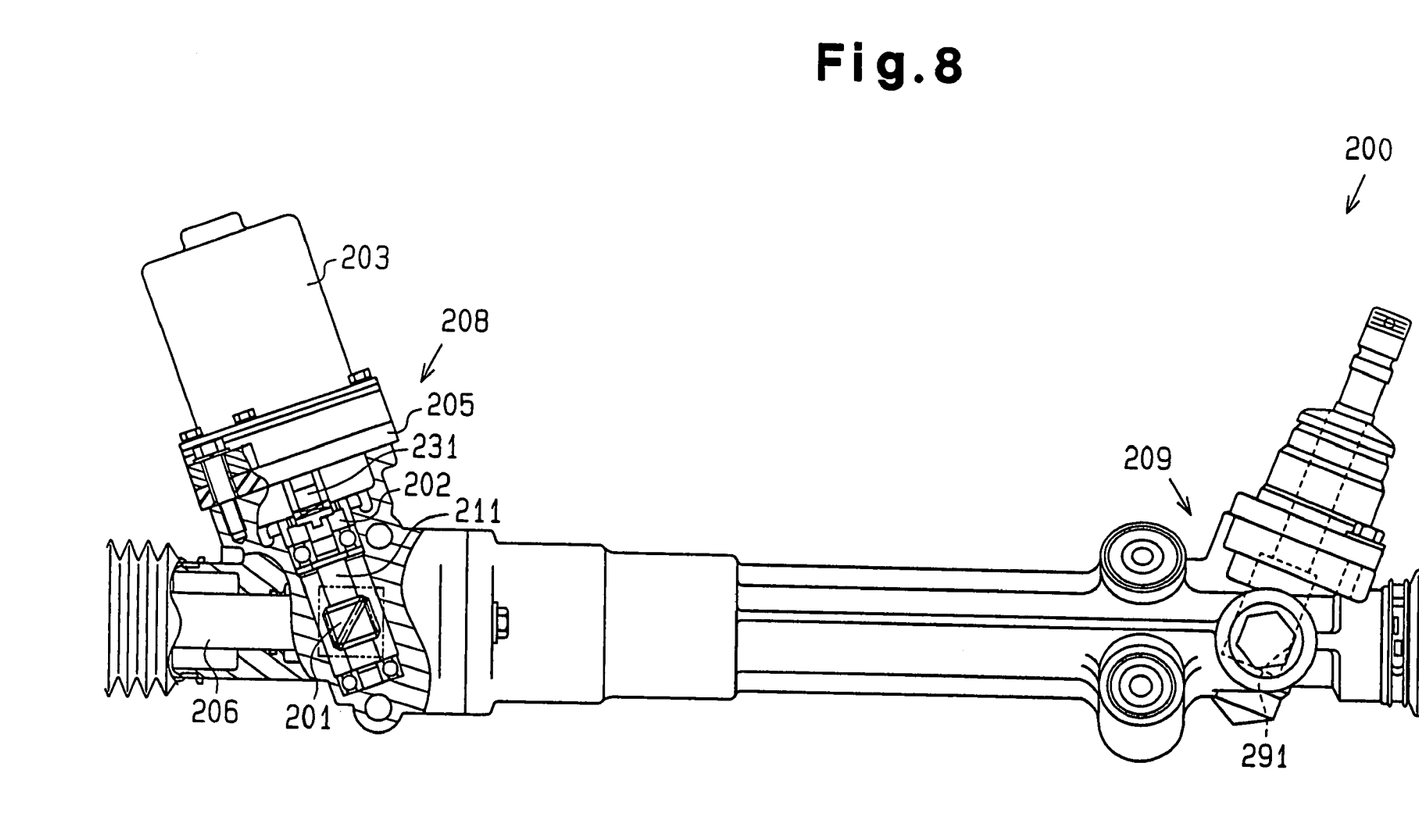
FIG. 8 is a plan view showing an electric power steering apparatus according to a third embodiment of the present invention.

As shown in FIG. 8, the power steering apparatus 200 includes a rack-and-pinion steering gear mechanism 209 and a power-assist unit 208 having an electric motor 203. The steering gear mechanism 209 includes a steering shaft (not shown) and a pinion gear 291, which is connected to a rack shaft 206.

The pinion gear 291 and the power-assist unit 208 are arranged at different positions. More specifically, the pinion gear 291 and the power-assist unit 208 are separated from each other along the axis of the rack shaft 206 and lie along the same plane in a generally symmetric manner. Since the power-assist unit 208 is separated from the pinion gear 291, the power steering apparatus 200 is well-balanced. In addition, the structure around the pinion gear 291, where various components related to the steering gear mechanism 209 are arranged in a concentrated manner, may be simplified. Thus, the space around the steering gear mechanism 209 may be used effectively. In addition, when the installation position of the steering wheel is changed between the left and right due to a change in where the vehicle is shipped to or the like, the necessary changes in the power steering apparatus 200 may be made quickly.

Figure 10:
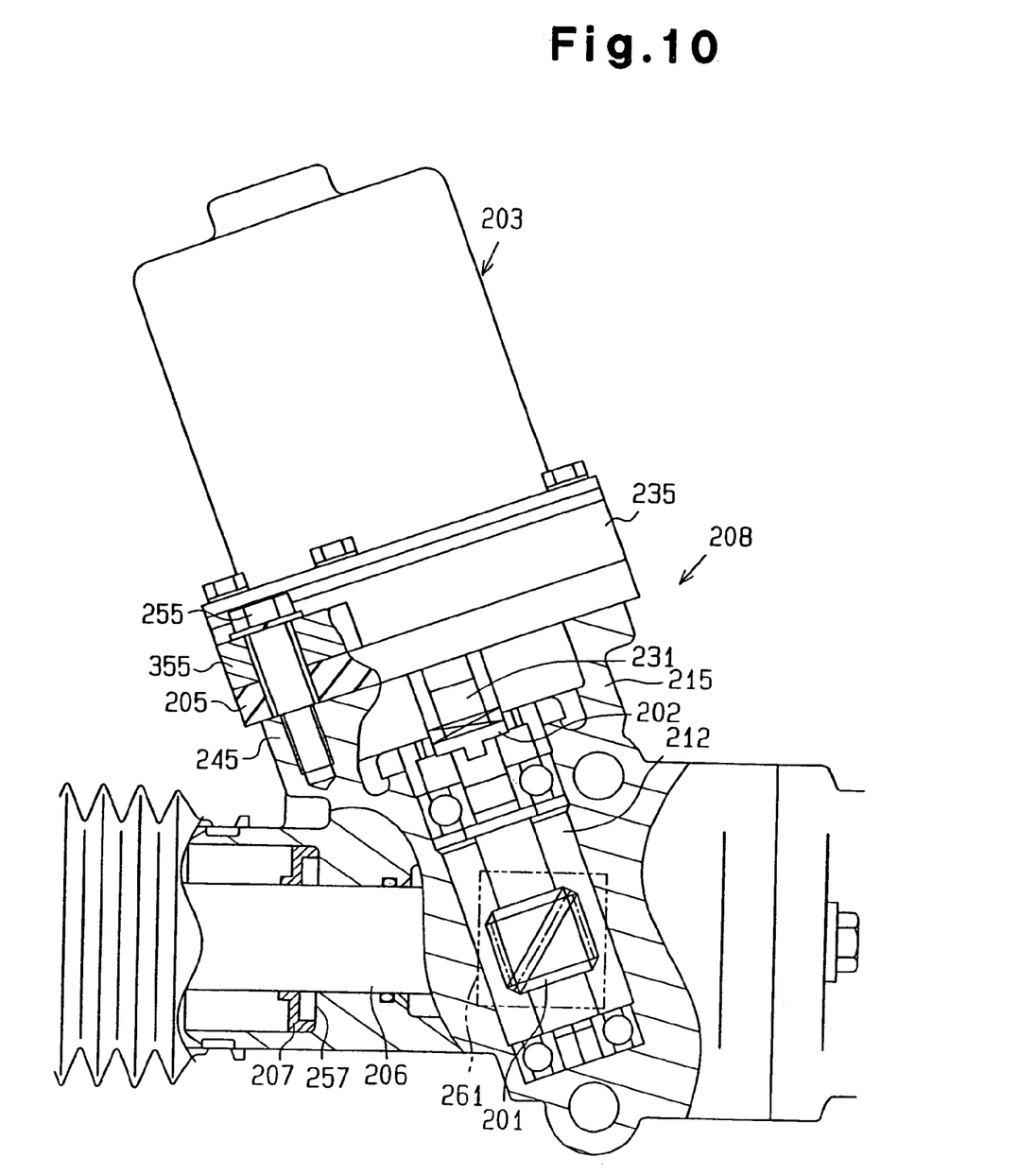
FIG. 10 is a cross-sectional view showing the main part of FIG. 8.

As shown in FIG. 10, a rotating shaft 231 of the electric motor 203 is connected to a rotating shaft 211 of a drive gear (small screw gear) 201 by a coupling 202. The drive gear 201 meshes with a driven gear (screw gear) 261, which is formed integrally with a ball nut 262. The drive gear 201 and the driven gear 261 define a reduction mechanism. A casing 235 of the electric motor 203 is fixed to a housing 215, which accommodates the small screw gear 201 and the coupling 202, by means of an elastic member 205 having a predetermined thickness.

Next, the power-assist unit 208 will be described below with reference to FIG. 10. As shown in FIG. 10, the rotating shaft 231 of the electric motor 203 is connected to the rotating shaft 211 of the small screw gear 201 by the Oldham coupling 202. The elastic member 205, which has the predetermined thickness, is arranged between a flange 355 of the casing 235, which accommodates the electric motor 203, and a flange 245 of the housing 215, which accommodates the small screw gear 201. The flanges 245 and 355 are fixed to each other by fastening means 255 such as bolts. Since the elastic member 205 is arranged between the housing 215 and the electric motor 203, there is a risk that the axis of the rotating shaft 231 of the electric motor 203 and that of the rotating shaft 211 of the small screw gear 201 will be misaligned during operation of the electric motor 203. The Oldham coupling 202 serves to absorb the influence of misalignment of the axes.

Figure 11:
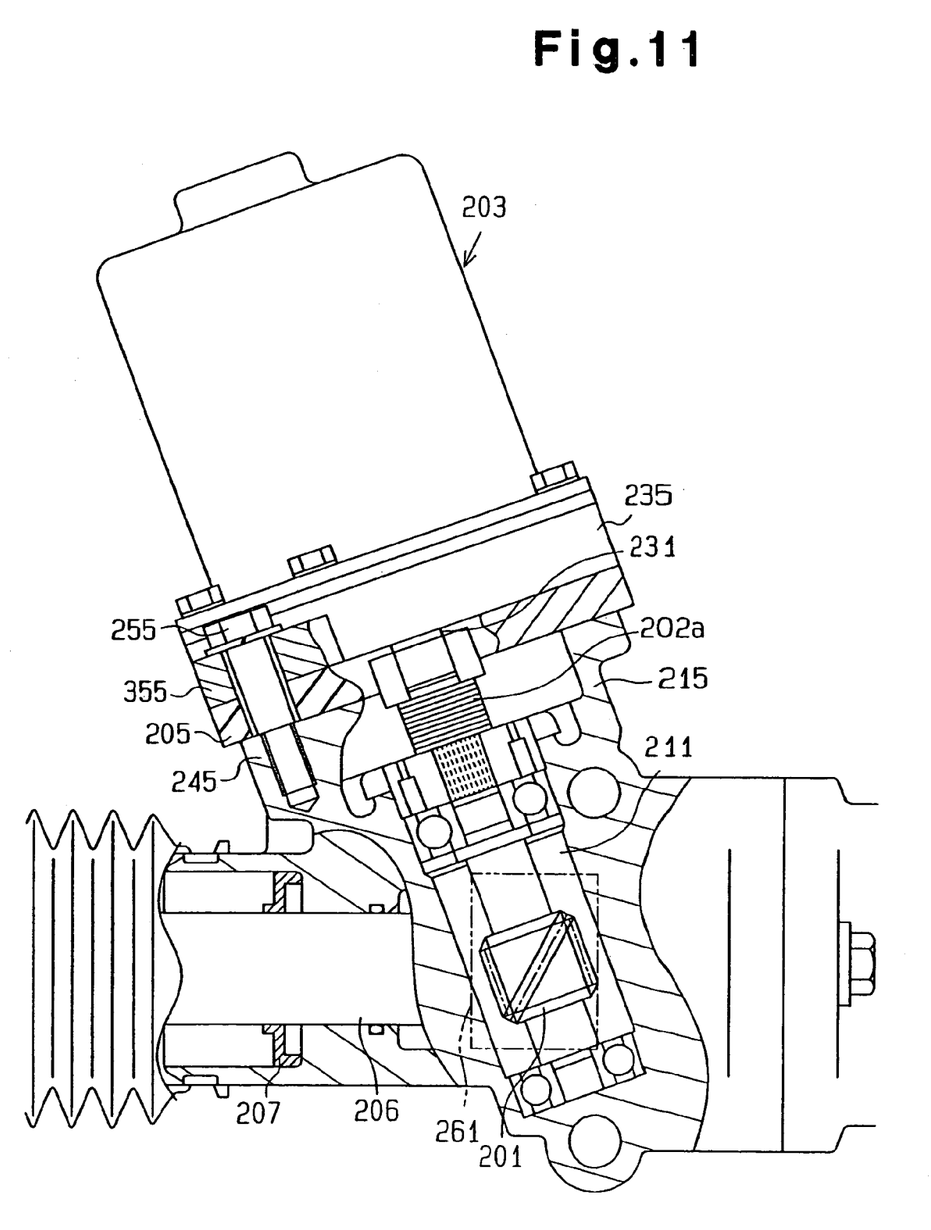
FIG. 11 is a diagram showing a modification of FIG. 10.

As shown in FIG. 11, a flexible coupling 202a composed of metal may also be used in place of the Oldham coupling 202. The flexible coupling 202a is formed by a plurality of flexible metal rings (metal-ring aggregate) arranged between the motor rotating shaft 231 and the rotating shaft 211 of the small screw gear 201. Since the metal rings can be inclined, although only slightly, with respect to one another, the entire body of the flexible coupling 202a may be deformed by a predetermined amount. Accordingly, even when the axis of the motor rotating shaft 231 and that of the rotating shaft 211 of the small screw gear 201 are misaligned or tilted with respect to each other, the flexible coupling 202a can cope with such conditions.

Figure 12:
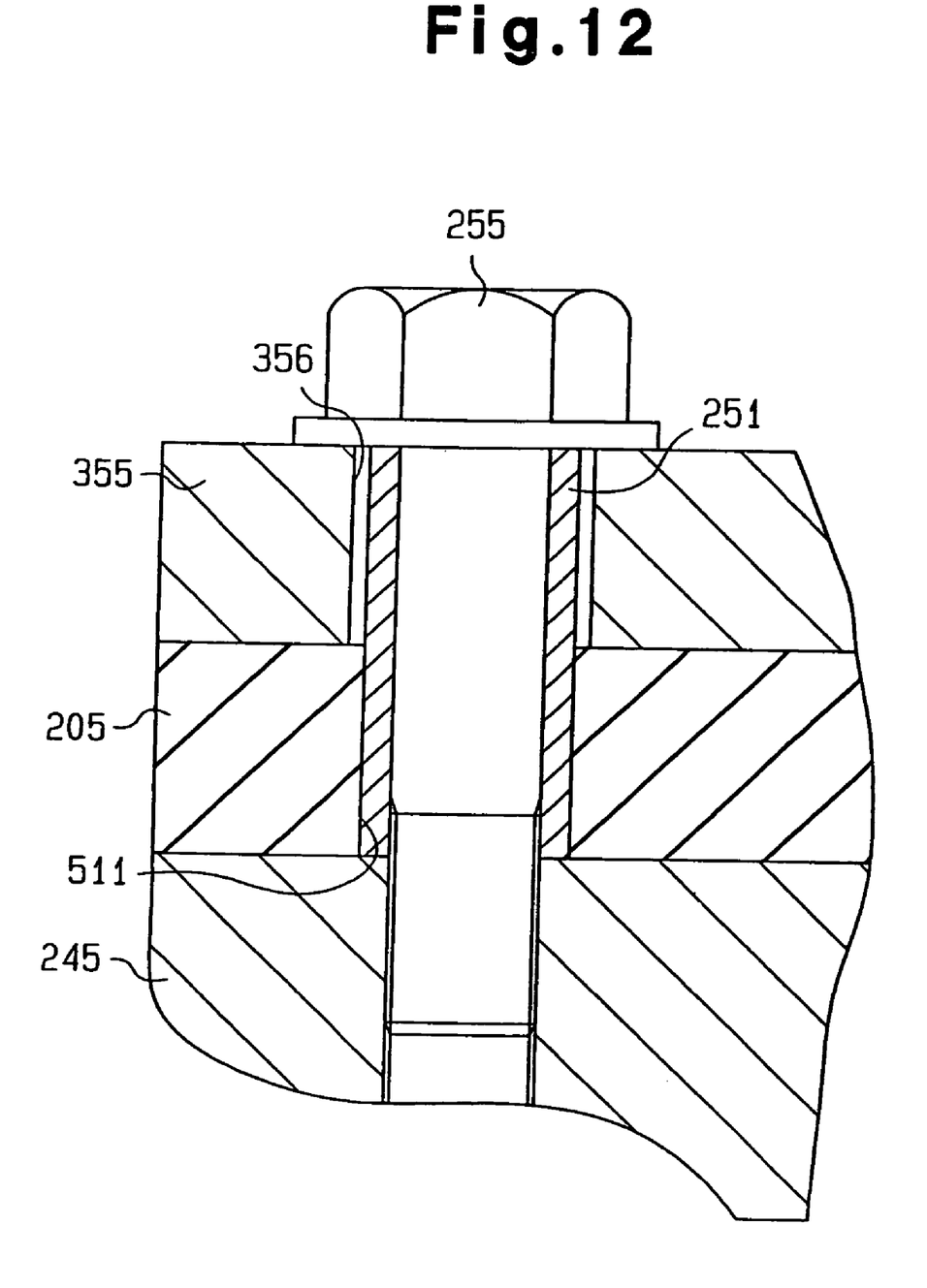
FIG. 12 is a cross-sectional view of an elastic member.

Next, the connection between the casing 235 and the housing 215 will be described. As shown in FIG. 12, the elastic member 205, which has the predetermined thickness, is arranged between the flange 355 of the casing 235 and the flange 245 of the housing 215. The elastic member 205 is in contact with the entire surfaces of the flanges 245 and 355. The elastic member 205 has a collar-receiving hole 511. A collar 251 having an outer diameter that is substantially the same as the inner diameter of the collar-receiving hole 511 is fitted in the collar-receiving hole 511. The flange 355 has a collar-receiving hole 356 having an inner diameter that is slightly larger than the outer diameter of the collar 251. The collar 251 is inserted in the collar-receiving hole 356. The lower end of the collar 251 is in contact with the upper surface of the flange 245. The collar 251 restricts the distance between the flanges 245 and 355. A fastening means 255 such as a flanged bolt is inserted through the collar 251 to fasten the flanges 245 and 355. When the elastic member 205 is deformed, the collar 251 and the fastening means 255 tolerates tilting of the casing 235.

Next, a buffer mechanism for reducing an impact applied at the ends of the steering stroke of the power steering apparatus 200 when the rack shaft 206 reaches the ends of its stroke will be described.

Figure 9:
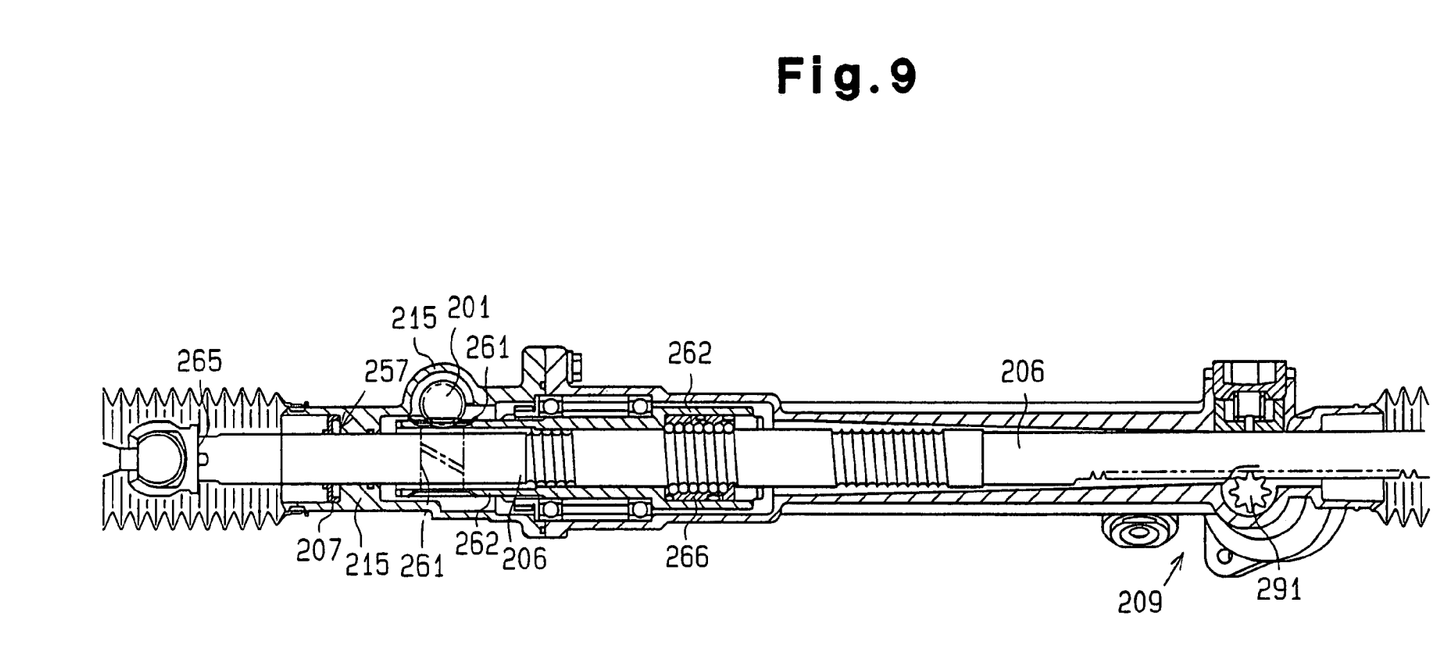
FIG. 9 is a cross-sectional view of the electric power steering apparatus shown in FIG. 8.

The power steering apparatus 200 includes a buffer mechanism which prevents a ball joint 265 formed on each end of the rack shaft 206 from hitting its respective stopper 257 of the housing 215 and generating a metallic impact noise when the rack shaft 206 reaches the ends of its stroke. As shown in FIGS. 9 and 10, the buffer mechanism includes a buffer member 207, like a leaf spring or a belleville spring, which is adjacent to the stopper 257 formed on part of the housing 215. When the rack shaft 206 reaches the end of its stroke, the buffer member 207 contacts the ball joint 265. Accordingly, the stopper 257 is prevented from hitting the ball joint 265 and generating vibration and noise.

The power steering apparatus 200 of the third embodiment has the advantages described below.

(19) The casing 235 is connected to the housing 215 by means of the elastic member 205. The vibration and noise of the electric motor 203 are blocked by the elastic member 205 and are not transmitted to the passenger compartment.

(20) The rotating shaft 231 of the electric motor 203 is connected to the rotating shaft 211 of the small screw gear 201 by the Oldham coupling 202 or the flexible coupling 202a. Accordingly, even when the elastic member 205 is deformed and the central axes of the two shafts 211 and 231 are misaligned, the rotational driving force of the electric motor 203 is smoothly transmitted to the small screw gear 201 via the coupling 202 or 202a. The vibration damping characteristics of the elastic member 205 are easily adjusted by selecting the proper thickness or hardness of the elastic member 205.

(21) The power-assist unit 208 and the pinion gear 291 are arranged at different positions. More specifically, the power-assist unit 208 and the pinion gear 291 are arranged on the axis of the rack shaft 206 at generally symmetric positions. Accordingly, the structure around the pinion gear 291, where various components related to the steering gear mechanism 209 are arranged in a concentrated manner, is simplified, and the space around the steering gear mechanism 209 may be used effectively. In addition, the adjustment of the gear mechanism 209 may be performed smoothly.

(22) The buffer member 207 is adjacent to the stopper 257 of the housing 215, which accommodates the rack shaft 206. When the rack shaft 206 reaches the end of its stroke, the buffer member 207 contacts the ball joint 265 provided at each end of the rack shaft 206 so that the ball joint 265 does not hit the stopper 257. This prevents the generation of vibration and noise. In addition, the ball nut 262 is prevented from being caught in the ball screw mechanism 266.

(23) The power-assist unit 208 may be arranged at any angle in a range of 360 degrees about the axis of the rack shaft 206. Thus, the power-assist unit 208 may be installed with a large degree of freedom.

(24) Even when the central axes of the shafts 211 and 231 are misaligned due to the deformation of the elastic member 205, the misalignment is tolerated since an Oldham coupling is used as the coupling 202.

The elastic member 205 may also be used in the power steering apparatuses 11 and 100 of the first and second embodiments.

What is claimed is:

1. An electric power steering apparatus for transmitting a driving force of a motor to a rack shaft via a reduction mechanism and a ball screw mechanism to assist movement of the rack shaft in a longitudinal axis thereof, wherein in the electric power steering apparatus:
the reduction mechanism includes a drive gear connected to a rotating shaft of the motor, and a driven gear meshed with the drive gear and connected to the ball screw mechanism via an elastic member, wherein the ball screw mechanism includes a ball screw nut having a helical first ball groove extending along its inner circumferential surface, a helical second ball groove extending along an outer circumferential surface of the rack shaft, and a plurality of balls arranged between the helical first ball groove and the helical second ball groove, and the driven gear is provided on the outer circumferential surface of the ball screw nut.

2. The electric power steering apparatus according to claim 1, wherein the drive gear is a first screw gear, the driven gear is a second screw gear, and the reduction mechanism is a screw gear mechanism including the first screw gear and the second screw gear.

3. The electric power steering apparatus according to claim 1, wherein the elastic member comprises a damper connecting the driven gear to the ball screw nut.

4. The electric power steering apparatus according to claim 1, further comprising a rack housing accommodating the rack shaft, wherein the motor is attached to the rack housing in the vicinity of one of the ends of the rack housing.

5. The electric power steering apparatus according to claim 4, further comprising a pinion shaft for transmitting a driving force of a steering wheel to the rack shaft, the pinion shaft including a pinion gear meshed with the rack teeth formed on the rack shaft, and the pinion shaft being arranged near the other one of the ends of the rack housing.

6. An electric power steering apparatus for transmitting a driving force of a motor to a rack shaft via a reduction mechanism and a ball screw mechanism to assist movement of the rack shaft in a longitudinal axis thereof, wherein in the electric power steering apparatus:
the reduction mechanism includes a drive gear connected to a rotating shaft of the motor, and a driven gear meshed with the drive gear and connected to the ball screw mechanism via an elastic member, wherein the drive gear is a first bevel gear the driven gear is a second bevel gear, and the reduction mechanism is a bevel gear mechanism including the first bevel gear and the second bevel gear.

7. The electric power steering apparatus according to claim 6, wherein each of the first bevel gear and the second bevel gear is an angular bevel gear, and the bevel gear mechanism is an angular bevel gear mechanism.

8. The electric power steering apparatus according to claim 7, wherein the ball screw mechanism includes a ball screw nut having a helical first ball groove extending along its inner circumferential surface, a helical second ball groove extending along an outer circumferential surface of the rack shaft, and a plurality of balls arranged between the helical first ball groove and the helical second ball groove, and the driven gear is provided on the outer circumferential surface of the ball screw nut.

9. The electric power steering apparatus according to claim 7, comprising:
a coupling arranged between the rotating shaft of the motor and a rotating shaft of the drive gear to transmit the rotation of the rotating shaft of the motor to the rotating shaft of the drive gear, wherein the coupling tolerates axes misalignment of the rotating shaft of the drive gear and the rotating shaft of the motor;
a casing for accommodating the motor;
a housing for accommodating the drive gear; and
another elastic member having a predetermined thickness arranged between the casing and the housing, with the casing attached to the housing by means of the another elastic member.

10. The electric power steering apparatus according to claim 6, wherein the ball screw mechanism includes a ball screw nut having a helical first ball groove extending along its inner circumferential surface, a helical second ball groove extending along an outer circumferential surface of the rack shaft, and a plurality of balls arranged between the helical first ball groove and the helical second ball groove, and the driven gear is provided on the outer circumferential surface of the ball screw nut.

11. The electric power steering apparatus according to claim 6, comprising:
a coupling arranged between the rotating shaft of the motor and a rotating shaft of the drive gear to transmit the rotation of the rotating shaft of the motor to the rotating shaft of the drive gear, wherein the coupling tolerates axes misalignment of the rotating shaft of the drive gear and the rotating shaft of the motor;
a casing for accommodating the motor;
a housing for accommodating the drive gear; and
another elastic member having a predetermined thickness arranged between the casing and the housing, with the casing attached to the housing by means of the another elastic member.

12. An electric power steering apparatus for transmitting a driving force of a motor to a rack shaft via a reduction mechanism and a ball screw mechanism to assist movement of the rack shaft in a longitudinal axis thereof, wherein in the electric power steering apparatus:
the reduction mechanism includes a drive gear connected to a rotating shaft of the motor, and a driven gear meshed with the drive gear and connected to the ball screw mechanism via an elastic member, further comprising:
a coupling arranged between the rotating shaft of the motor and a rotating shaft of the drive gear to transmit the rotation of the rotating shaft of the motor to the rotating shaft of the drive gear, wherein the coupling tolerates axes misalignment of the rotating shaft of the drive gear and the rotating shaft of the motor;
a casing for accommodating the motor;
a housing for accommodating the drive gear; and
another elastic member having a predetermined thickness arranged between the casing and the housing, with the casing attached to the housing by the another elastic member.

13. The electric power steering apparatus according to claim 12, wherein the coupling is an Oldham coupling.

14. An electric power steering apparatus for transmitting a driving force of a motor to a rack shaft via a reduction mechanism and a ball screw mechanism to assist movement of the rack shaft in a longitudinal axis thereof, wherein in the electric power steering apparatus:
the reduction mechanism includes a drive gear connected to a rotating shaft of the motor, and a driven gear meshed with the drive gear and connected to the ball screw mechanism;
a rack housing accommodating the rack shaft, wherein the motor is attached to the rack housing in the vicinity of one of the ends of the rack housing;
a pinion shaft for transmitting a driving force of a steering wheel to the rack shaft, the pinion shaft including a pinion gear meshed with the rack teeth formed on the rack shaft, and the pinion shaft being arranged near the other one of the ends of the rack housing,
wherein an axis of the motor and an axis of the pinion shaft are symmetric to each other about a reference line perpendicular to a longitudinal axis of the rack housing at the center of the rack housing along the longitudinal axis.

15. The electric power steering apparatus according to claim 14, wherein the motor and the pinion shaft become farther from the reference line as the motor and the pinion shaft become farther from the rack housing.

16. An electric power steering apparatus comprising:
a rack shaft having a longitudinal axis;
a rack housing for accommodating the rack shaft and having a first end and a second end;
a pinion shaft arranged in the vicinity of the first end of the rack housing and connected to the rack shaft;
a motor arranged in the vicinity of the second end of the rack housing;
a ball nut arranged coaxially to the rack shaft in a manner covering the rack shaft, wherein the ball nut is rotated relative to the rack shaft to move the rack shaft along the longitudinal axis; and
a reduction mechanism arranged between the motor and the ball nut to transmit rotation of a rotating shaft of the motor to the ball screw nut while reducing the speed of the rotation, wherein the reduction mechanism includes a drive gear coaxially connected to the rotating shaft of the motor and a driven gear arranged on the outer surface of the ball screw nut via an elastic member and meshed with the drive gear, with the axis of the drive gear inclined with respect to the axis of the driven gear.

17. The electric power steering apparatus according to claim 16, wherein the elastic member comprises a damper connecting the driven gear to the ball nut.

18. An electric power steering apparatus for transmitting a driving force of a motor to a rack shaft via a reduction mechanism and a ball screw mechanism to assist movement of the rack shaft in a longitudinal axis thereof, wherein in the electric power steering apparatus:
the reduction mechanism includes a drive gear connected to a rotating shaft of the motor, and a driven gear meshed with the drive gear and connected to the ball screw mechanism via an elastic member, wherein the drive gear is a first screw gear, the driven gear is a second screw gear, and the reduction mechanism is a screw gear mechanism including the first screw gear and the second screw gear, wherein the ball screw mechanism includes a ball screw nut having a helical first ball groove extending along its inner circumferential surface, a helical second ball groove extending along an outer circumferential surface of the rack shaft, and a plurality of balls arranged between the helical first ball groove and the helical second ball groove, and the driven gear is provided on the outer circumferential surface of the ball screw nut.

19. An electric power steering apparatus for transmitting a driving force of a motor to a rack shaft via a reduction mechanism and a ball screw mechanism to assist movement of the rack shaft in a longitudinal axis thereof, wherein in the electric power steering apparatus:
the reduction mechanism includes a drive gear connected to a rotating shaft of the motor, and a driven gear meshed with the drive gear and connected to the ball screw mechanism via an elastic member, wherein the drive gear is a first screw gear, the driven gear is a second screw gear, and the reduction mechanism is a screw gear mechanism including the first screw gear and the second screw gear, comprising:
a coupling arranged between the rotating shaft of the motor and a rotating shaft of the drive gear to transmit the rotation of the rotating shaft of the motor to the rotating shaft of the drive gear, wherein the coupling tolerates axes misalignment of the rotating shaft of the drive gear and the rotating shaft of the motor;
a casing for accommodating the motor;
a housing for accommodating the drive gear; and
another elastic member having a predetermined thickness arranged between the casing and the housing, with the casing attached to the housing by means of the another elastic member.

* * * * *